Figure 1:
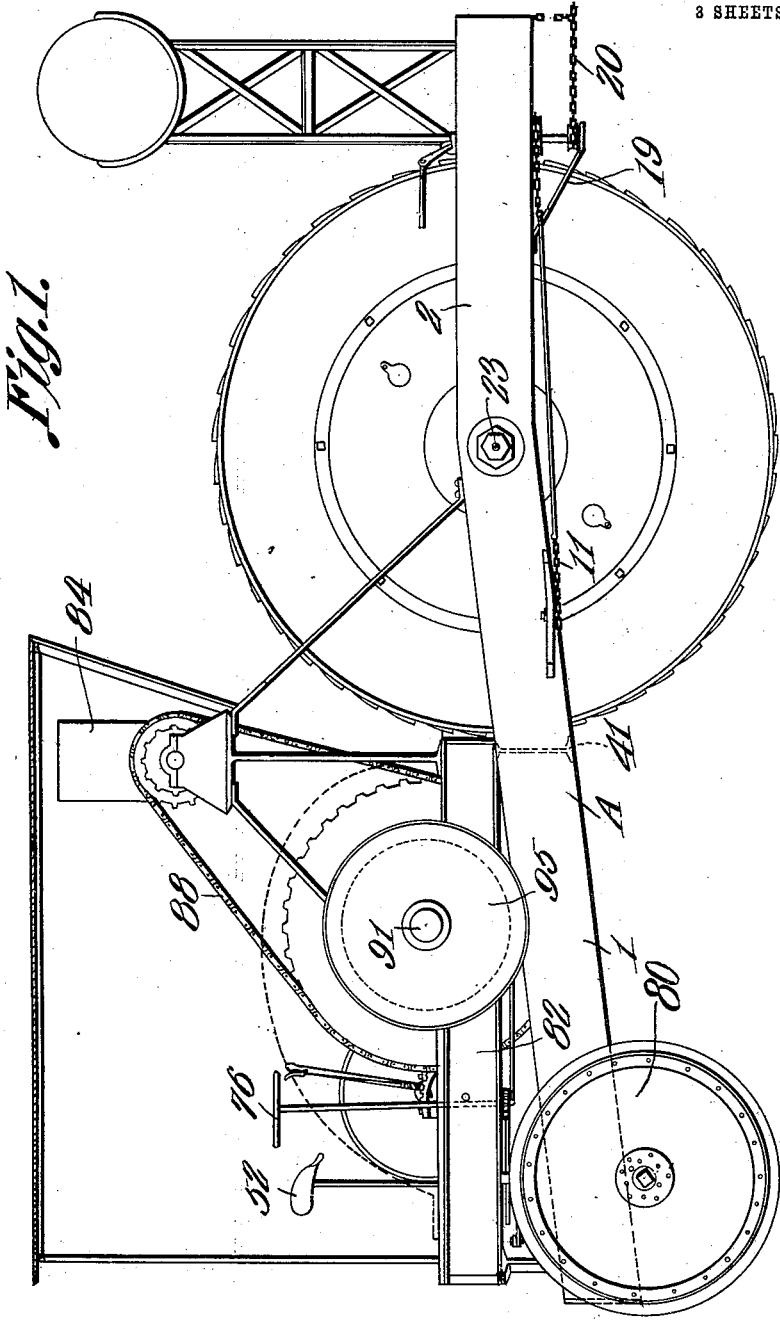

J. D. INGRAM.
TRACTION ENGINE.
APPLICATION FILED AUG. 9, 1911.

1,085,812.

Patented Feb. 3, 1914.
3 SHEETS—SHEET 1.

Joseph D. Ingram,
Inventor

Witnesses by C. A. Snow & Co.
Attorneys

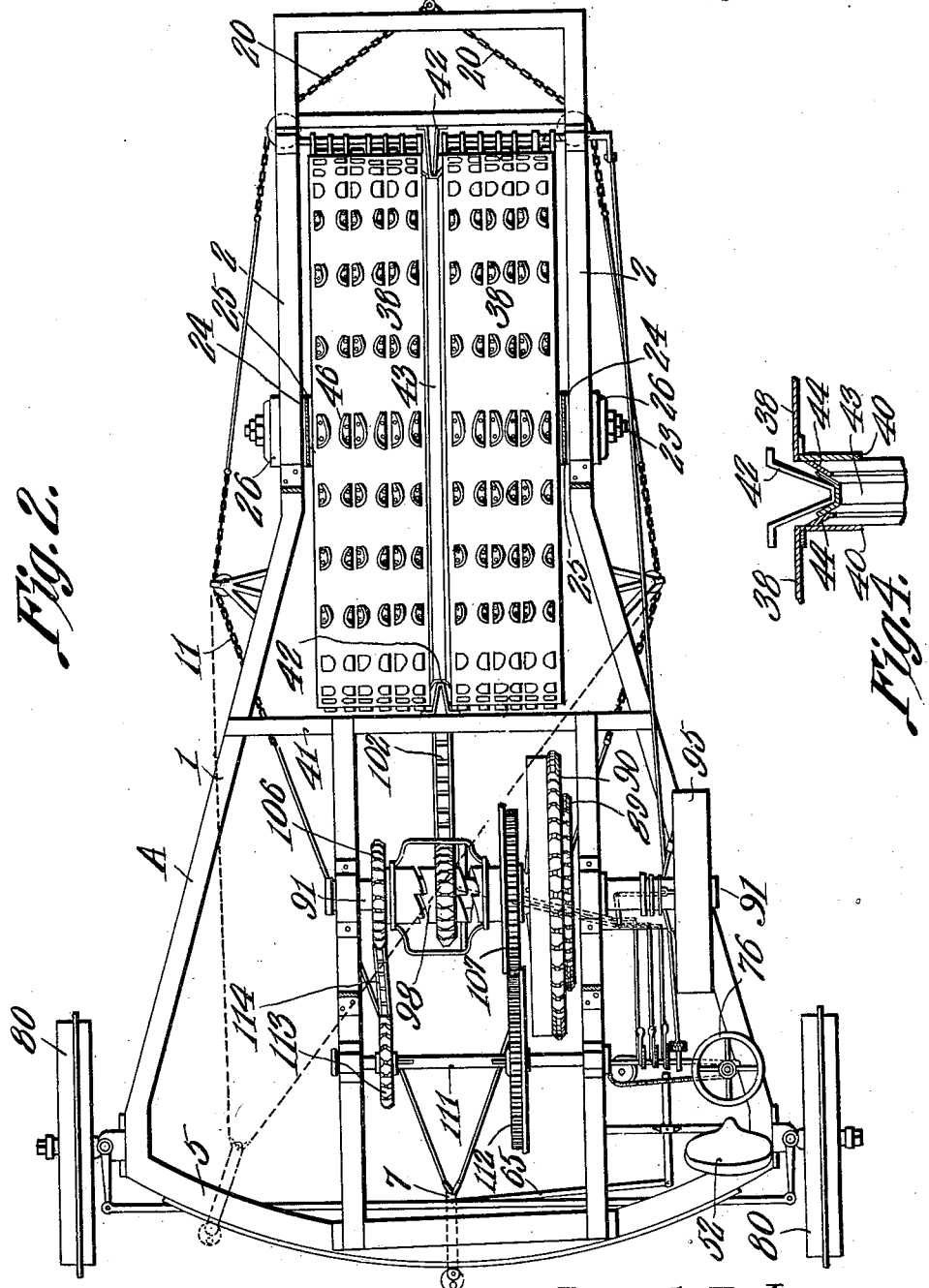

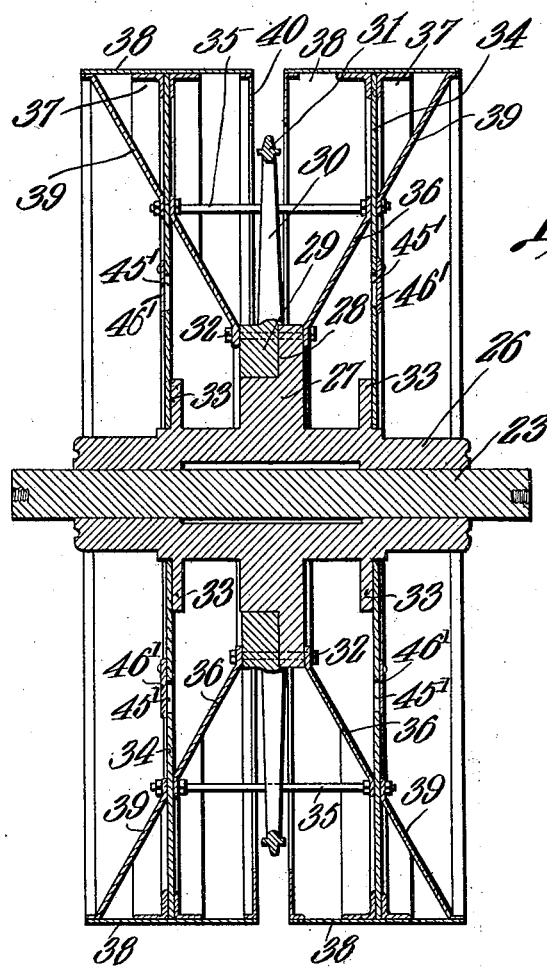

UNITED STATES PATENT OFFICE.

JOSEPH D. INGRAM, OF WASHBURN, TEXAS.

TRACTION-ENGINE.

1,085,812.  Specification of Letters Patent.  Patented Feb. 3, 1914.

Application filed August 9, 1911. Serial No. 643,085.

*To all whom it may concern:*

Be it known that I, JOSEPH D. INGRAM, a citizen of the United States, residing at Washburn, in the county of Carson and State of Texas, have invented a new and useful Traction-Engine, of which the following is a specification.

This invention relates to traction engines of that type particularly designed for agricultural purposes, one of the objects of the invention being to provide driving wheels of novel construction and having means combined therewith whereby the mechanism employed for transmitting motion thereto is protected from dirt, moisture, etc.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawings:—Figure 1 is a view partly in side elevation and partly in section, of the complete machine. Fig. 2 is a plan view of the machine, portions thereof being removed. Fig. 3 is an enlarged central vertical transverse section through the driving wheel of the machine. Fig. 4 is a section through a portion of the driving wheel and its guard.

Referring to the figures by characters of reference A designates the main frame of the machine the side beams 1 of which preferably converge forwardly and terminate in parallel portions 2 which are suitably connected. A draft element 7 may be extended from the back of the frame, this element being connected to the frame in any preferred manner, as by means of chains, rods and the like extending around the frame A. This connection has been indicated at 11. Another chain such as indicated at 20 may be extended forwardly from the frame for coupling said frame to any suitable draft device.

An axle 23 is mounted at its ends within the forwardly extending portions 2 of the frame A and close to the forwardly diverging beams 1, any desired means being employed for securing the ends of the axle within the member A and for holding said axle against rotation. Collars 24 are secured in the frame and about the axle 23, these collars having anti-friction balls 25 or the like interposed between them and a hub 26 which is mounted for rotation upon the axle. As shown particularly in Fig. 3 said hub has a central annular flange 27 formed with an annular recess 28 in which is seated a ring 29. Spokes 30 radiate from this ring and connect it to the rim 31 of a sprocket. It is of course to be understood that instead of providing spokes, a web or any other suitable connection may be interposed between the ring 29 and the rim 31. Ring 29 is secured to the flange 27 by bolts or the like, indicated at 32 so that said sprocket will at all times rotate with the hub 26.

Formed upon the hub 26 between each end thereof and the flange 27 is an annular flange 33 to which is bolted or otherwise secured a disk 34. The two disks are equidistant from the sprocket 31 and may be connected to said sprocket by tie bolts 35. These bolts and the bolts 32 can also be utilized for securing outwardly diverging braces 36 to the disks 34 and to the flange 27. Flanged rings 37 are riveted or otherwise secured to the faces of the disks 34 close to the peripheries thereof and are, in turn, riveted or otherwise secured to the inner surfaces of the broad rims 38 of the driving wheel. The two rims do not come together but, instead, a sufficient space is left between them to permit the passage of a chain to the sprocket 31. Braces 39 may be extended from the bolts 35 to the outer edges of the rims 38. Interior annular flanges 40 are preferably secured within the rims close to their inner edges.

A beam 41 is interposed between and connects the beams 1 and mounted on this beam and on the front portion of frame A are annular brackets 42 extended toward the axle 23. These brackets support curved channeled shields 43 formed of metal and extending almost continuously around the axle 23 but close to and between the flanges 40. The ends of the shield are located adjacent beam 41 and the space between them is sufficient to permit the passage of a chain employed for driving the sprocket 31 and which will be hereinafter described.

It is to be understood that any other arrangement of brackets 42 may be employed and these brackets can be located wherever feasible so that the shields 43 will be held fixed and prevented from sagging. Strips 44 of leather or other suitable flexible material are secured to the sides of the shield 43 and bear against the flanges 40, thus co-operating with the flanges to prevent the admission of dust and moisture into the space surrounded by the rims 38 and between the disks 34. Access may be had to this space, whenever desired, through openings 45' formed in the disks 34 and which are normally closed by pivoted plates 46' or other suitable devices.

The outer faces of the rims 38 are provided with annular series of soil engaging elements 46.

Combined supporting and steering wheels 80 are suitably connected to the rear portion of the main frame A and may be operated by any suitable steering mechanism designated generally at 65, this mechanism being operated by a hand wheel 76 located close to the seat 52 to be occupied by the operator. A motor 84 is suitably supported above the main frame A and is adapted to transmit motion through a chain 88, to a sprocket 90 or a sprocket 89, these two sprockets rotating together and being fixedly secured on a shaft 91. A clutch member 98 is loosely mounted on shaft 91 and carries a sprocket 101 which transmits motion, through a chain 102, to the sprocket 31 hereinbefore referred to, the runs of the chain being extended between the ends of the guard 42. A sprocket 106 and a gear 107 are loosely mounted on shaft 91 and carry clutch members either of which is adapted to engage the clutch member 98. A counter shaft 111 is provided with a gear 112 and a sprocket 113, gear 112 being constantly in mesh with gear 107, and a chain 114 engages sprockets 113 and 106.

Any suitable mechanism may be provided for coupling gear 107 to the sprockets 89 and 90 so that it will rotate therewith and any desired mechanism can be employed for shifting the clutch member of the sprocket 106 and gear 107 so as to bring either of them into engagement with clutch member 98 so that motion can be transmitted from shaft 91 through gears 107 and 112, counter shaft 111, and sprocket 113, chain 114 and sprocket 106 to the clutch member 98, thus to drive the machine in one direction, or motion can be transmitted directly from shaft 91 through the clutch member of gear 107 to the clutch member 98, thus to drive the machine in the opposite direction.

Shaft 91 can be provided with a fly wheel and pulley 95 which can be provided with any suitable means for coupling it to or uncoupling it from the shaft 91.

What is claimed is:—

In a traction engine, the combination with a frame, of a non-rotatable axle carried thereby, a hub mounted for rotation on the axle, disks secured to and extending around said hub, rims secured to the peripheral portions of the respective disks and spaced apart to form an annular slot, means extending through the slot for rotating the hub, an arcuate shield concentric with the rims and extending across the slot, and inwardly extending means carried by the rims and co-operating with the shield to prevent the admission of dust into the space between the disks.

In testimony that I claim the foregoing as my own, I have hereto affixed my signature in the presence of two witnesses.

JOSEPH D. INGRAM.

Witnesses:
I. RANDOLPH,
WILL HERRMANN.

---

Copies of this patent may be obtained for five cents each, by addressing the "Commissioner of Patents, Washington, D. C."